United States Patent Office 3,291,308
Patented Dec. 13, 1966

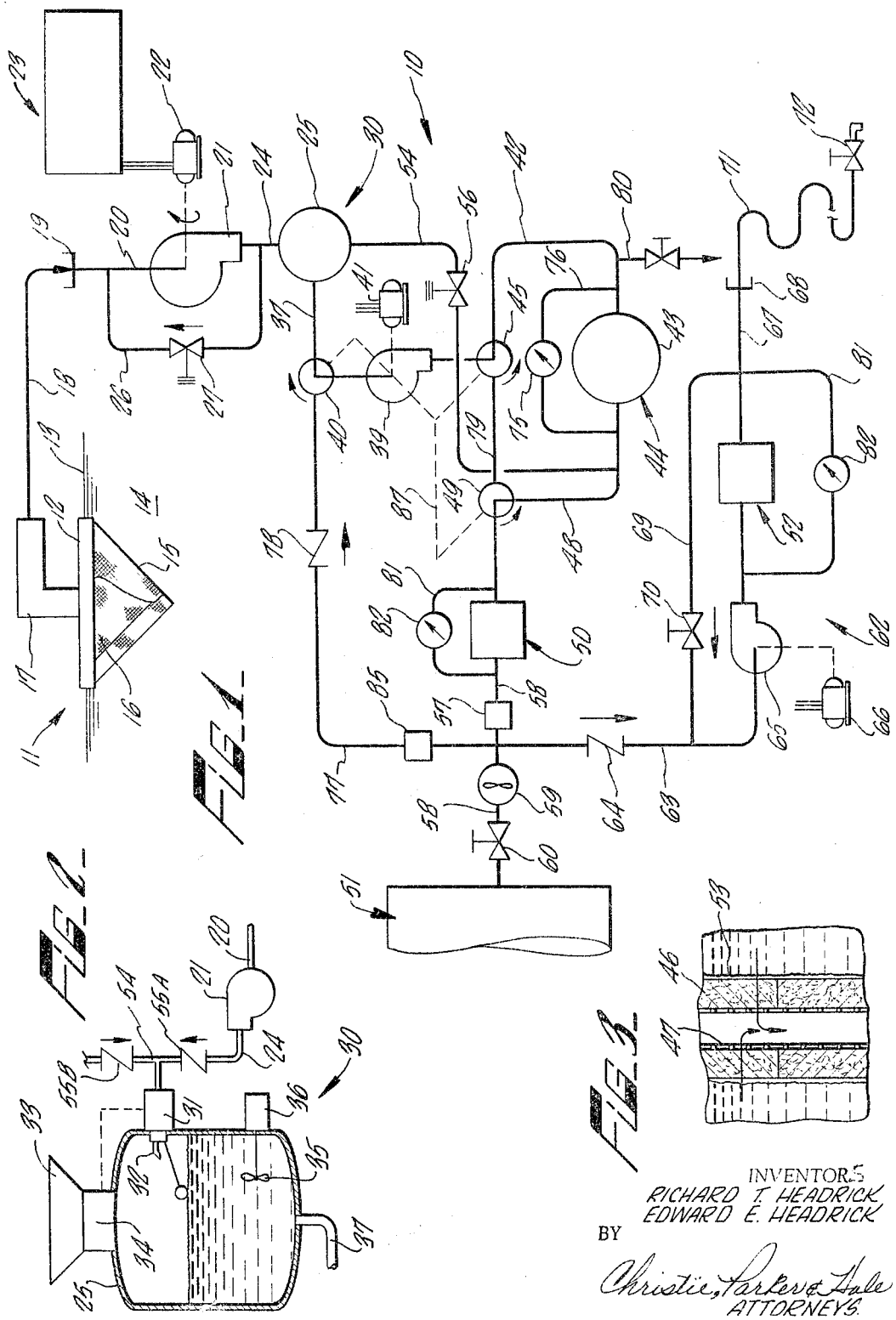

3,291,308
WATER PURIFICATION SYSTEM
Richard T. Headrick, 916 Crestfield Ave., Duarte, Calif., and Edward E. Headrick, 4900 Crown Ave., La Canada, Calif.
Filed May 15, 1964, Ser. No. 367,806
14 Claims. (Cl. 210—101)

This invention relates to a water purification system. More particularly, it relates to a compact transportable water purification system adapted to provide completely palatable and potable drinking water from a contaminated water source.

This invention provides a novel water purification system using a new combination of apparatus which presently is available in commercial and domestic trade. The invention provides a highly effective and efficient, yet inexpensive water purification system which does not require highly skilled personnel for its maintenance and operation. The apparatus provides a large capacity, yet it maintains fine filtration characteristics, such that bacteriological and particulate contaminants are removed from the contaminated water. The invention is particularly useful in conjunction with military, civil defense, or natural disaster operations.

In the past, portable water treatment facilities had been dependent upon the use of chemical additives to the contaminated water to remove bacteriological contaminants. Because of the requirement that the apparatus be portable, the required high precision chemical monitoring apparatus was omitted or compromised in prior systems. In existing systems where precision apparatus is provided to maintain exact monitoring of the chemical additive, the apparatus is delicate and is often damaged during transportation. The result in such systems is that the product, filtered and treated water, is not completely potable and is often actually sickening to personnel consuming such filtered and treated water. In addition, existing systems require the use of highly trained operators. Further, conventional chemically orientated systems require the use of costly, bulky, and complex equipment to provide sufficient quantities of the chemical additives. This invention, on the other hand, provides an essentially mechanical filtration and purification system, only a single additive is used and the mechanism provided for dispensing the additive is rugged and simple to operate. The product water is potable and palatable.

Generally speaking, the invention provides apparatus for purifying water drawn from a source of contaminated water and includes intake means for drawing water from the contaminated water source. Proportioning means, having an outlet and an inlet coupled to the intake means are provided. The proportioning means are operable for adding to water introduced thereinto a quantity of a bacteriocidal agent in proportion to the quantity of the water introduced into the proportioning means. The apparatus further includes a first filter means having an outlet and an inlet coupled to the proportioning means outlet. The first filter means is operable for removing from water circulated through it the bacteriocidal agent and particulate matter dispersed and suspended in the water. Duct means are coupled between the first filter means outlet and the proportioning means for recirculating a selected portion of the water circulated through the first filter means back to the proportioning means for addition of the bacteriocidal agent thereto. The apparatus also includes second filter means coupled to the first filter means outlet for further bacteriocidally treating and filtering the remainder of the water circulated through the first filter means, so that the water discharged from the system is potable and palatable.

These and other features and objects of the invention will be more fully presented in the following detailed description and explanation of the invention, taken in conjunction with the accompanying drawings, wherein:

FIG. 1 is a schematic diagram of a water purification system provided by this invention;

FIG. 2 is an elevation view of the proportioning means of the system, and

FIG. 3 is a fragmentary cross-sectional elevation view of a portion of the structure of the first filter means.

Referring to FIG. 1, a water purification system 10 according to this invention is shown. The system includes a float-type intake unit 11 which includes a float member 12. The float member is adapted to float on surface 13 of a body of water 14, such as a stream or pond, from which water to be purified is drawn. An outer cone 15 of relatively large mesh filter screen is secured to the undersurface of the float member and depends into the body of water. A second inner cone 16 of finer mesh filter screen 16 is secured to the underside of the float member inside cone 15. A duct fitting 17 is coupled to the upper side of the float member and fluidly communicates with the interior of screen cone 16. When the float member is disposed on surface 13 of the water, the lower surface of the float member is disposed below the surface of the water so that material such as scum or leaves floating on the surface of the water is kept from the filter screens. It is desirable to intake raw water from adjacent the surface of the body of water rather than from the adjacent bottom of the body of water since water adjacent the surface is less contaminated by silt and the like. Intake unit 11, therefore, provides a coarse filtration of the water to be treated in system 10. In a preferred form of this invention, the screen of cone 15 is a 16 mesh screen, while the screen of cone 16 is a 40 mesh screen.

An intake hose 18 is coupled between float unit fitting 17 and an inlet fitting 19 which is secured to one end of an inlet duct 20 which has its other end secured to the suction or intake of a positive displacement pump 21. Pump 21 is powered by an electric motor 22. Electrical power for motor 22 and for the other motors in system 10 is supplied by a diesel electric generator 23. In a presently preferred apparatus embodying system 10 the generator provides 7500 watts of 3-phase power at 220 volts.

Pump 21, as indicated above, is a positive displacement pump and discharges water drawn through intake unit 11 at 7 gallons per minute (g.p.m.). This water is discharged from the pump through a duct 24 which fluidly communicates with the inlet of a tank 25. A bypass duct 26 is coupled in parallel with pump 21 and includes a pressure relief valve 27 having a check valve function so that water circulates only from the discharge side of pump 21 to the intake side of the pump when the valve permits flow through bypass duct 26. The valve is set to permit a full flow of 7 g.p.m. therethrough when the pressure in duct 24 exceeds 5 lbs. per square inch gauge; again, this is referred to a presently preferred apparatus which embodies system 10.

Tank 25 is a portion of a proportioning means 30 which is shown in greater detail in FIG. 2. Duct 24 is connected to a meter 31 secured to tank 25 at an upper exterior portion thereof. As water flows through meter 31 it operates a suitable impeller or vane type mechanism therein to provide a mechanical output proportional to the rate of flow of water through the meter. Water is discharged from the meter into tank 25 through a float controlled tank inlet 32. A hopper 33, adapted to receive granular material, is mounted to the upper portion of tank 25. The hopper itself is carried by a dispensing mechanism 34 which is connected between the lower end of the hopper and the upper interior end of the tank.

The dispensing mechanism is operatively coupled to meter 31 as shown in FIG. 2, and operates to dispense the material contained in the hopper 33 to the tank in a predetermined ratio to the quantity of water flowing through meter 31.

A granular bacteriocidal agent is disposed in hopper 33 and is added to the water introduced into tank 25 by the above described mechanisms. An agitator 35 is disposed in the lower portion of the tank and is operated by a motor 36 and supplied by power from diesel generator 23. The agitator is operable to intermix the granular bacteriocidal agent with water introduced into the tank. The tank has an outlet at its lower end to which is connected a duct 37.

Duct 37 extends from the proportioning means to a second centrifugal pump 39 via a first selector valve 40. Pump 39 is driven by a motor 41 and is a centrifugal pump which discharges water supplied to it from tank 25 at 30 g.p.m. and at 40 lbs. per square inch gage pressure. A duct 42 is connected from the discharge side of pump 39 to the inlet of a tank 43 which is a part of a first filter means 44 of system 10. A second selector valve 45 is disposed in duct 42. The significance of the difference in rate of discharge of pumps 21 and 39 will be described below. It is noted at this point, however, that the discharge rate of pump 39 is selected to assure that water circulates through first filter means 44 at a rate sufficient to maintain a cake of the granular bacteriodical agent on the matrices present in the first filter means.

Interiorly of tank 43 a plurality of annularly bored cylindrical porous filter matrices 46 (see FIG. 3) are carried by a plurality of foraminous pipes 47. Water introduced into tank 43 flows radially inwardly through the filter matrices to pipes 47 which are connected to the outlet of the first filter means.

A duct 48 is connected to the outlet of tank 43 and extends via a third selector valve 49 to second filter means 50 of system 10. The downstream or discharge end of the second filter means passes filtered water either to a storage tank 51, or to a discharge or third filtering means 52, each of which will be described in greater detail below.

It was mentioned above that a quantity of a granulated bacteriocidal agent is contained in hopper 33 of proportioning means 30, and that a quantity of this agent is dispensed into tank 25 in proportion to the quantity of water introduced into the tank. In a preferred apparatus embodying this invention, the bacterial agent is a granular filtration media sold under the trademark Puro-Cel by Ogden Filter Company, Inc., of Los Angeles, California. This media includes diatomaceous earth and carbon which has been treated to have a bacteriocidal action upon microorganisms. The media is also treated to prevent the reproduction and growth of microorganic life. This media is effective to remove bad tastes, odors, color, iron, and detergents from water into which it is introduced. Preferably about 4 lbs. of this filtration media are added to each 100 gallons of water introduced into tank 25. Other bacterial agents may be used with system 10 if desired.

A slurry-like mixture of the granular bacteriocidal agent and water is supplied to the interior of tank 43 by pump 39. The porous filter matrices mounted inside tank 43 act as a filter mechanism for separating from the water the bacteriocidal agent and other particles suspended and dispersed in the water. These separated particles accumulate as a porous layer or cake 53 on the outer circumference of filter matrices 46. This cake augments the filtering action of the matrices. Since this cake contains a bacteriocidal agent, the bacteriocidal treatment of the water flowing through tank 43 is enhanced. The water leaving tank 43 via duct 48 is substantially free from bacteria since the bulk of the bacteria present in the water drawn from pond 14 are killed by the action of the agent and are removed from the water in the first filter means.

As noted above, in order that a sufficient cake of filtered particulate material may be maintained on the filter matrices in tank 43, a high flow rate through the tank is desired. If the flow rate through the matrices is too low, the matter filtered from the water passing through the matrices will accumulate in the bottom of tank 43 rather than on the matrices. Accordingly, pump 39 supplies water from tank 25 to tank 43 at 30 gallons per minute. This is compared with the 7 gallons per minute discharge of pump 21. In order that a substantially constant quantity of water may be maintained inside tank 25, a recirculation duct 54 is connected from the outlet of the first filter means to tank 25. As shown in the drawings, duct 54 is connected to duct 48 between tank 43 and third selector valve 49, and to duct 24 between pump 21 and meter 31. Check valves 55A and 55B are disposed in ducts 24 and 54, respectively, (see FIG. 2) and assure that water from pump 21 does not flow through duct 54 to the outlet of the first filter means, and that water from the first filter means does not flow to the discharge of pump 21 or through duct 26. A flow regulating valve 56 is included in duct 54 and is set to limit fluid flow through duct 55 to 23 gallons per minute. This assures that the water level in tank 25 is maintained essentially constant. Filtered water from the first filter means is introduced to second filter means 50 at a rate of 7 gallons per minute. This corresponds to the rate at which untreated water from pond 14 is supplied to the system through pump 21. A flow controller 57 is disposed in a duct 58 which connects the outlet of the second filter means 50 with the inlet of storage tank 51 and further assures that the flow rate through the second filter means is maintained at 7 g.p.m.

If desired, recirculation duct 54 may be connected directly to the upper end of tank 25. In this case check valves 55A and 55B are not required, and dispenser 34 operates only in response to the quantity of water entering tank 25 from pump 21.

The reintroduction of 23 gallons per minute of water treated in the first filter means to tank 25 assures that the bulk of the water handled by the system will have sufficient contact with the bacteriocidal agent dispensed from hopper 33 to assure that the major portion of the bacteria population of the raw water is killed by the bacteriocidal agent. There will, of course, be some dead bacteria present in the water introduced to the second filter means since the pore sizes of matrices 46 and cake 53 present in the first filter means must necessarily be large to accommodate a flow rate of 30 g.p.m. therethrough. Also, there will be a small amount of live bacteria present in the water introduced to the second filter means since a small portion of the water introduced into the system will flow directly through the proportioning means and the first filter means to the second filter means. These bacteria are killed and are removed from the water in the second filter means.

Generally, liquid filtration is a mechanical method of screening out particles suspended in the liquid to be treated. In most cases the size of the passages in the filter media determines the size of the particles which can be removed. To retain particles the size of bacteria, the pores of the media necessarily must be of such a small size that it is difficult to force liquid through the filter media even under high pressure. Such a media would have a tendency to close off or become plugged in a very short time as filtration occurs. Such plugging reduces the effective flow rate of the system and requires frequent replacement of the filter media. To overcome such difficulty in the second filter means, this invention uses a filter media which has an average pore size of approximately 15 microns, yet which is capable of removing particles of 0.1 micron in diameter from the contaminated fluid passing therethrough. Such a filter media is basically asbestos, cellulose, and carbon treated so that one portion of the filter media has a permanent negative electrostatic charge, while the other portion of the media has a permanent positive electrostatic charge. These portions are intermixed in filter discs of the cartridge type which operate mechanically on water passing therethrough. Such a filter media is effective to remove suspended particles which arrive at second filter means 50. Such suspended particles inherently have an electrostatic charge carried thereon. The electrostatic charges provided in the filter media remove the suspended particles, both by mechanical and electrostatic operation. The filter media is also treated to kill bacteria introduced thereto. The bacteria removed from the filtered water do not multiply in the second filter means. Such filter means as have been described as constituting the preferred form of the operative elements of second filter means 50 are available from the Ogden Filter Company, Inc., and are illustrated in Ogden's catalog No. A1A. 29–D–31.

Water treated in the second filter means 50 is passed via duct 58 through flow controller 57 and then through a propellor type flow indicator 59 and a manually operable valve 60 to storage tank 51. Preferably tank 51 is a collapsible rubber tank which has the feature that, when the system is not in use, the tank may be rolled up into a small volume. Such a tank contributes to the transportability of system 10. As indicated above, the water discharged from the second filter means is supplied either to storage tank 51, or to a filtered watered discharge circuit 62 which includes third filter means 52. The third filter means is identical to the second filter means.

Discharge circuit 62 includes a duct 63 which is connected to duct 58 between flow controller 57 and flow gage 59. A check valve 64 is provided in duct 63 and prevents backflow of the water from the discharge circuit to duct 58. Duct 63 is connected to the inlet or suction of a positive displacement pump 65 which discharges water at 7 g.p.m. Pump 65 is driven by a motor 66 powered from diesel generator 23. A duct 67 is connected between the discharge of pump 65 and a system outlet fitting 68. The third filter means 52 are disposed in duct 67. A recirculation duct 69 is connected from duct 67 downstream of the second filter means to duct 63 between check valve 64 and pump 65. A flow regulating valve, set to limit flow through duct 69 to 7 g.p.m. and having a check valve function, is disposed in duct 69. A flexible discharge hose 71 is secured to outlet fitting 68 at one of its ends and includes a manually valved discharge nozzle 72 at its other end.

The above-described circuitry of water treatment system 10 has the feature that the system may be operated continuously. If purified water is not required for consumption, the water treated in the first and second filter means is introduced to tank 51 for storage. If purified water is required, however, pump 65 is operated so that water is drawn from the discharge side of the second filter means. If water is discharged from nozzle 72 at a rate less than 7 gallons per minute, the excess of the water discharged from pump 65 is recirculated through recirculation duct 69. If water is desired to be supplied from the system at a time when the first filter means is being backwashed, water is supplied to the discharge circuit from tank 51. In this case, the third filter means 52 is operable to remove any unpleasant taste or sediment from the water, which taste or sediment may be present because of storage in tank 51.

The major portion of the contaminants present in the water drawn from pond 14 are removed from the water in the first filter means 44. Accordingly, it is this component of the system which has the greatest tendency of being overloaded or clogged by the contaiminants removed from the raw water. Clogging of the first filter means is indicated by the pressure drop across the unit, such being indicated by a differential pressure gage 75 disposed in a pressure monitoring duct 76 connected in parallel with the first filter means. When the reading on pressure gage 75 reaches a predetermined value the system is backwashed by treated water drawn from storage tank 51.

For the purposes of backwashing the first filter means, the system includes a first backwash duct 77 which has one end connected to duct 58 between flow controller 57 and flow gage 59. The other end of the first backwash duct is connected to first selector valve 40. A check valve 78 is disposed in the first backwash duct and prevents flow of water from the first selector valve to duct 58. A second backwash or by-pass duct 79 is connected between the second and third selector valves. As indicated in FIG. 1, the selector valves are mechanically interconnected, as shown by dash lines 87, so that they may all be operated simultaneously.

To backwash the first filter means, the selector valves are operated so that fluid flow connection is made from tank 51 through duct 77 to the inlet of pump 39. Fluid flow connection is also made from the discharge side of pump 39 via the second backwash duct to the outlet of the first filter means. When the selector valves are disposed in their backwash condition, duct 37 is closed off from pump 39 and duct 42 is isolated from pump 39. Pump 39 is operated so that water is drawn from tank 51 and is applied to the outlet of the first filter means. Such a flow of water through the first filter means removes cake 53 from the filter matrices contained in tank 43. The water used in backwashing the first filter means is discharged from the system through a manually valved backwash drain 80 which is connected to duct 42 between first filter means and second selector valve 45. The backwash cycle lasts approximately 6 minutes and consumes approximately 40 gallons of processed water in a preferred embodiment of the invention. A flow controller 85 is disposed in duct 77 to regulate the backwash flowrate to 7 g.p.m.

The second and third filter means are also subject to being clogged by particulate matter removed from the water flowing therethrough. These filter means, as indicated above, preferably have the filter media mounted in cartridge type units. Each of the second and third filter means is provided with a pressure monitoring duct 81 and a differential pressure gage 82 disposed in parallel fluid flow relation therewith. When the readings on pressure gages 82 reaches a predetermined value, the operator of the system is informed that it is necessary to replace the cartridges of the second and third filter means.

Apparatus embodying water purification system 10 was used to purify water drawn from the duck pond of Los Angeles County Arboretum at Arcadia, California. Water samples were taken from the system at the discharge of first filter means 44 and from the discharge of second filter means 50. Portions of these samples were applied to an agar culture plate which was maintained at 37° C. for 24 hours. The water taken from the discharge of the first filter means showed a bacteria count of 97 bacteria per milliliters. The coliform index of such water, based upon a 100-milliliter sample was 5.1. The sample extracted from the system at the discharge of the second filter means, however, indicated 16 bacteria per milliliter as determined by a similar agar plate analysis. The coliform index was 0.0 and clearly is safe by American Public Health Association standards. An agar plate culture of the raw water drawn directly from the pond showed bacteria too numerous to count. The coliform index of such raw water was over 16.

The water drawn from noozle 72 is even purer than the water withdrawn from the outlet of the second filter means, since it passes through the third filter means. Such water is considered entirely palatable and is obviously potable.

Apparatus embodying purification system 10 requires only a single person for its operation. This person need not be highly trained and his duties consist primarily of maintaining an adequate supply of the bacteriocidal agent in hopper 33 of the proportioning means, and in observing the readings on differential pressure gages 75 and 82 to determine when a backwash cycle or cartridge replacement is required. The system lends itself to mounting on a small flatbed trailer or air transportable pallet. The collapsible storage tank and the intake and discharge hoses are also storable on this trailer. The system has particular utility in providing a military tactical "in field" water supply. The system is also useful in providing safe water following a natural disaster, such as a flood, earthquake, or hurricane, as well as in areas where epidemic conditions exist rendering the local water supplies suspect.

While the invention has been described above in conjunction with specific apparatus, this has been by way of example only and is not to be considered as limiting the scope of this invention.

What is claimed is:

1. Apparatus for purifying and rendering potable water drawn from a source of contaminated water comprising:
   (1) intake means for drawing water from the source of contaminated water,
   (2) proportioning means having an outlet and an inlet coupled to the intake means and operable for adding to water introduced thereinto a substantially water insoluble predetermined quantity of a particulate bacteriocidal agent in proportion to the quantity of the introduced water,
   (3) first filter means having an outlet and an inlet coupled to the proportioning means outlet and operable for removing from water circulated therethrough the insoluble particulate bacteriocidal agent and particulate matter dispersed and suspended in the water,
   (4) duct means coupled between the first filter means outlet and the proportioning means for recirculating a selected portion of the water circulated through the first filter means to the proportioning means for addition of the bacteriocidal agent thereto, and
   (5) second filter means coupled to the first filter means outlet for further bacteriocidally treating and filtering the remainder of the water circulated through the first filter means to render the same potable.

2. Apparatus according to claim 1 wherein the first filter means comprises a vessel, a foraminous tube in the vessel, a body of porous filter matrix material carried by the tube externally thereof, the interior of the tube being communicated to the outlet of the first filter means so that, during operation of the apparatus, a porous cake of said agent is formed on said matrix material by introducing a mixture of water and the bacteriocidal agent into the vessel and flowing the water through the matrix material so that the agent and other particulate material in the water accumulates on the matrix material, said porous cake augmenting the filtering action of the matrix material.

3. Apparatus for purifying water drawn from a source of contaminated water comprising:
   (1) intake means for drawing water from the source of contaminated water,
   (2) proportioning means coupled to the intake means and having an outlet and operable for adding to water introduced thereinto a predetermined quantity of a particulate bacteriocidal agent in proportion to the quantity of the introduced water,
   (3) first filter means having an outlet and an inlet coupled to the proportioning means outlet and operable for removing from water circulated therethrough the bacteriocidal agent and particulate matter dispersed and suspended in the water,
   (4) means coupled between the first filter means outlet and the proportioning means for recirculating a selected portion of the water circulated through the first filter means to the proportioning means for addition of the bacteriocidal agent thereto,
   (5) second filter means having an outlet and an inlet coupled to the first filter means outlet for bacteriocidally treating and filtering the remainder of the water circulated through the first filter means,
   (6) purified water storage means coupled to the second filter means outlet, and
   (7) selectively operable third filter means having an outlet from which water is discharged for consumption and an inlet coupled between the second filter means outlet and the storage means for receiving water from either or both of the second filter means and the storage means, said third filter means bacteriocidally treating and filtering water circulated therethrough.

4. Apparatus according to claim 3 wherein the first filter means comprises a vessel, a foraminous tube in the vessel, a body of porous filter matrix material carried by the tube externally thereof, wherein a mixture of water and the bacteriocidal agent is introduced into the vessel and flows through the matrix material so that the agent and other particulate material in the water accumulates on the matrix material as a porous cake to augment the filtering action of the matrix material.

5. Apparatus according to claim 3 wherein the third filter means includes a pump having a discharge, a filter unit connected to the discharge of the pump, a recirculation duct coupled in parallel fluid flow relation with the pump and filter unit, and a manually operable valve coupled to the outlet of the filter unit, whereby water flows through the recirculation duct when the rate of water flow through the valve is less than the rate of discharge from the pump.

6. Apparatus according to claim 3 wherein the intake means includes a float member adapted to float on the surface of a body of water from which water to be purified is drawn, duct means disposed on the float member for communication with said body of water and secured to a duct which fluidly communicates with the proportioning means, and filter screen means carried by the float member for preventing the entry of water floating on the surface of said body of water into the duct means.

7. Apparatus according to claim 3 wherein the intake means includes a pump discharging water therefrom at a first predetermined flowrate, and a second pump connected between the proportioning means and the first filter means for intaking a mixture of the bacteriocidal agent and water from the proportioning means and for discharging said mixture to the first filter means at a second flowrate in excess of the first predetermined flowrate of the intake pump, means for restricting the flowrate of water from the first filter means to the second filter means to substantial equality with the first predetermined flowrate, said duct means allowing flow of the excess of the discharge of the second pump over the first predetermined flowrate to the proportioning means.

8. Apparatus according to claim 3 including means for backwashing the first filter means.

9. Apparatus according to claim 8 wherein the means for backwashing comprises a pump coupled between the proportioning means and the first filter means, a first backwash duct coupled between the storage means and the inlet of the pump, a second backwash duct coupled between the outlet of the pump and the outlet of the first filter means, and valve means operable to isolate the proportioning means and the second filter means from the pump and the first filter means, respectively, and to connect the first and second backwash ducts in fluid flow communication with the pump.

10. Apparatus for purifying water drawn from a source of contaminated water comprising:
   (1) intake means for drawing water from the source of contaminated water, (2) proportioning means having an outlet and an inlet coupled to the intake means and operable for adding a proportionate quantity of a particulate bacteriocidal agent to water introduced thereinto,
(3) first filter means comprising a housing, a porous matrix in the housing, an outlet fluidly communicating with one side of the matrix and an inlet fluidly communicating with the other side of the matrix and operable, in combination with quantities of the agent accumulating on said other side of the matrix, for removing the bacteriocidal agent and particulate matter dispersed and suspended in water circulated therethrough,
(4) first duct means fluidly communicating between the proportioning means outlet and the first filter means inlet and including a pump discharging a mixture of water and bacteriocidal agent,
(5) second filter means having an outlet and an inlet coupled to the first filter means outlet for bacteriocidally treating and filtering the remainder of the water circulated through the first filter means,
(6) purified water storage means coupled to the second filter means outlet for storing purified water discharged from the second filter means, and
(7) backwash means for the first filter means matrix comprising:
    (a) a supply duct coupled between the storage means and the inlet of the pump,
    (b) a by-pass duct coupled between the outlet of the pump and the first filter means outlet, and
    (c) valve means in the supply and by-pass ducts operable to fluidly connect the pump with the supply duct and with the by-pass duct and to isolate the proportioning means and the second filter means.

11. Apparatus for purifying water drawn from a source of contaminated water comprising:
(1) intake means for drawing water from the source of contaminated water and including a pump discharging intaken water at a predetermined flowrate,
(2) proportioning means having an outlet and an inlet coupled to the intake means and operable for adding a proportionate quantity of a particulate bacteriocidal agent to water introduced thereinto,
(3) first filter means comprising a housing, a porous matrix in the housing, an outlet fluidly communicating with one side of the matrix and an inlet fluidly communicating with the other side of the matrix and operable, in combination with quantities of the agent accumulating on said other side of the matrix, for removing the bacteriocidal agent and particulate matter dispersed and suspended in water circulated therethrough,
(4) first duct means fluidly communicating between the proportioning means outlet and the first filter means inlet and including a second pump discharging a mixture of water and bacteriocidal agent at a flowrate in excess of the intake means flowrate,
(5) a recirculation duct coupled between the first filter means outlet and the proportioning means for recirculating a selected portion of the water circulated through the first filter means to the proportioning means for addition of the bacteriocidal agent thereto,
(6) second filter means having an outlet and an inlet coupled to the first filter means outlet for bacteriocidally treating and filtering the remainder of the water circulated through the first filter means,
(7) flow controller means coupled to the second filter means for restricting flow therethrough to a flowrate substantially equal to the predetermined flowrate of the intake means,
(8) purified water storage means coupled to the second filter means outlet for storing purified water discharged from the second filter means, and
(9) backwash means for the first filter means matrix comprising:
    (a) a supply duct coupled between the storage means and the inlet of the second pump,
    (b) a by-pass duct coupled between the outlet of the second pump and the first filter means outlet, and
    (c) valve means in the supply and by-pass ducts operable to fluidly connect the second pump with the supply duct and with the by-pass duct and to isolate the proportioning means and the second filter means.

12. Apparatus for purifying water drawn from a source of contaminated water comprising:
(1) intake means for drawing water from the source of contaminated water and including a pump discharging intaken water at a predetermined flowrate,
(2) proportioning means having an outlet and an inlet coupled to the intake means and operable for adding a proportionate quantity of a particulate bacteriocidal agent to water introduced thereinto,
(3) first filter means comprising a housing, a porous matrix in the housing, an outlet fluidly communicating with one side of the matrix and an inlet fluidly communicating with the other side of the matrix and operable, in combination with quantities of the agent accumulating on said other side of the matrix, for removing the bacteriocidal agent and particulate matter dispersed and suspended in water circulated therethrough,
(4) first duct means fluidly communicating between the proportioning means outlet and the first filter means inlet and including a second pump discharging a mixture of water and bacteriocidal agent at a flowrate in excess of the intake means flowrate,
(5) a recirculation duct coupled between the first filter means outlet and the proportioning means for recirculating a selected portion of the water circulated through the first filter means to the proportioning means for addition of the bacteriocidal agent thereto,
(6) second filter means having an outlet and an inlet coupled to the first filter means outlet for bacteriocidally treating and filtering the remainder of the water circulated through the first filter means,
(7) flow controller means coupled to the second filter means for restricting flow therethrough to a flowrate substantially equal to the predetermined flowrate of the intake means,
(8) purified water storage means coupled to the second filter means outlet for storing purified water discharged from the second filter means,
(9) backwash means for the first filter means matrix comprising:
    (a) a supply duct coupled between the storage means and the inlet of the second pump,
    (b) a by-pass duct coupled between the outlet of the second pump and the first filter means outlet, and
    (c) valve means in the supply and by-pass ducts operable to fluidly connect the second pump with the supply duct and with the by-pass duct and to isolate the proportioning means and the second filter means, and
(10) third filter means having an inlet coupled to the outlet of the second filter means and to the storage means and an outlet coupled to an outlet of the purifying apparatus and including a pump for drawing water from the storage means, the third filter means being operable to remove tastes and sediment from water circulated therethrough.

13. Apparatus for purifying water drawn from a source of contaminated water comprising:
(1) intake means for drawing water from the source of contaminated water at a predetermined flowrate, (2) proportioning means having an outlet and an inlet coupled to the intake means and operable for adding a proportionate quantity of a particulate bacteriocidal agent to water introduced thereinto, (3) first filter means comprising a housing, a porous matrix in the housing, an outlet fluidly communicating with one side of the matrix and an inlet fluidly communicating with the other side of the matrix and operable, in combination with quantities of the agent accumulating on said other side of the matrix, for removing the bacteriocidal agent and particulate matter dispersed and suspended in water circulated therethrough, (4) first duct means fluidly communicating between the proportioning means outlet and the first filter means inlet and including a pump discharging a mixture of water and bacteriocidal agent at a flowrate in excess of the predetermined flowrate, (5) second filter means having an outlet and an inlet coupled to the first filter means outlet for bacteriocidally treating and filtering water circulated therethrough from the first filter means, (6) flow controller means coupled to the second filter means for restricting flow therethrough to a flowrate equal to the predetedmined flowrate, and (7) a recirculation duct coupled between the first filter means outlet and the proportioning means for flow to the proportioning means of that portion of the pump discharge which exceeds the flowrate through the second filter means.

14. Apparatus for purifying and rendering potable water drawn from a source of contaminated water comprising (1) intake means for drawing water from the source at a first selected rate, (2) proportioning means having an outlet and an inlet coupled to the intake means to receive substantially all of the water passed through the intake means and operable for adding to water introduced thereinto a predetermined quantity of a particulate bacteriocidal agent in proportion to the quantity of water so introduced, (3) first filter means having an outlet and an inlet coupled to the proportioning means outlet and operable for removing from water circulated therethrough the bacteriocidal agent and particulate matter dispersed and suspended in the water, (4) duct means coupled between the first filter means outlet and the proportioning means for recirculating a portion of the water circulated through the first filter means to the proportioning means at a second selected rate less than the first selected rate for addition of the bacteriocidal agent thereto, and (5) second filter means coupled to the first filter means outlet for further bacteriocidally treating and filtering the remainder of the water circulated through the first filter means to render the same potable.

References Cited by the Examiner

UNITED STATES PATENTS

| 948,785 | 2/1910 | Lajois | 210—203 X |
| 1,080,233 | 12/1913 | Reynolds | 210—205 X |
| 2,626,728 | 1/1953 | Harper | 210—101 X |

REUBEN FRIEDMAN, *Primary Examiner.*

D. M. RIESS, *Assistant Examiner.*